(12) United States Patent  
Dalferth et al.

(10) Patent No.: US 6,925,794 B2  
(45) Date of Patent: Aug. 9, 2005

(54) CHAIN, CHAIN WHEEL AND CHAIN TRANSMISSION FOR LIFTING GEAR

(75) Inventors: Hans Dalferth, Aalen (DE); Rolf Sinz, Heubach (DE)

(73) Assignee: RUD Kettenfabrik Reiger & Dietz GmbH u. Co., Aalen-Unterkochen (DE)

( * ) Notice: Subject to any disclaimer, the term of this patent is extended or adjusted under 35 U.S.C. 154(b) by 256 days.

(21) Appl. No.: 10/343,674

(22) PCT Filed: Aug. 4, 2001

(86) PCT No.: PCT/DE01/02989

§ 371 (c)(1),  
(2), (4) Date: Feb. 3, 2003

(87) PCT Pub. No.: WO02/12753

PCT Pub. Date: Feb. 14, 2002

(65) Prior Publication Data

US 2003/0131580 A1 Jul. 17, 2003

(30) Foreign Application Priority Data

Aug. 9, 2000 (DE) .......................... 100 39 565

(51) Int. Cl.[7] .......................... F16H 7/06; F16G 13/02; F16G 13/18
(52) U.S. Cl. .............................. 59/78; 59/84; 474/206; 474/155
(58) Field of Search ............................ 59/78, 84, 80; 474/155, 164

(56) References Cited

U.S. PATENT DOCUMENTS

| 839,325 | A | * | 12/1906 | Scott | 474/155 |
|---|---|---|---|---|---|
| 2,321,702 | A | * | 6/1943 | Renkin | 474/155 |
| 3,410,085 | A | | 11/1968 | Sheth | |
| 3,453,823 | A | | 7/1969 | Mundt | |
| 4,108,014 | A | * | 8/1978 | Schreyer et al. | 474/155 |
| 4,473,364 | A | * | 9/1984 | Roling | 474/164 |
| 4,497,169 | A | * | 2/1985 | Millington | 59/84 |
| 4,627,232 | A | * | 12/1986 | Bruce | 59/84 |
| 4,850,942 | A | * | 7/1989 | Dalferth | 474/155 |
| 5,402,877 | A | * | 4/1995 | Thiele et al. | 474/155 |
| 5,533,938 | A | * | 7/1996 | Dalferth | 474/164 |
| 5,803,851 | A | * | 9/1998 | Walenta et al. | 474/155 |

FOREIGN PATENT DOCUMENTS

| DE | 3615734 | 11/1987 |
|---|---|---|
| DE | 4426506 | 2/1996 |
| EP | 0816717 | 1/1998 |
| EP | 0812295 | 12/1998 |

* cited by examiner

*Primary Examiner*—David B. Jones  
(74) *Attorney, Agent, or Firm*—Mark P. Stone

(57) ABSTRACT

A chain, a chain wheel and a chain transmission for a lifting gear in accordance with the present invention increases the dynamic resistance of a round steel chain that is primarily intended for use in combination with a lifting gear. The chain members (5, 6) are locally deformed plastically in the area of their braces (9, 10) so as to form flat lateral zones (11).

20 Claims, 3 Drawing Sheets

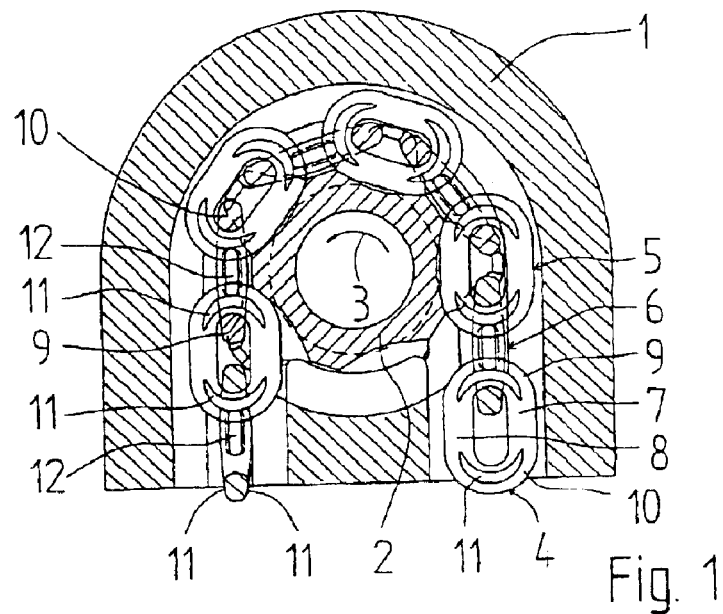
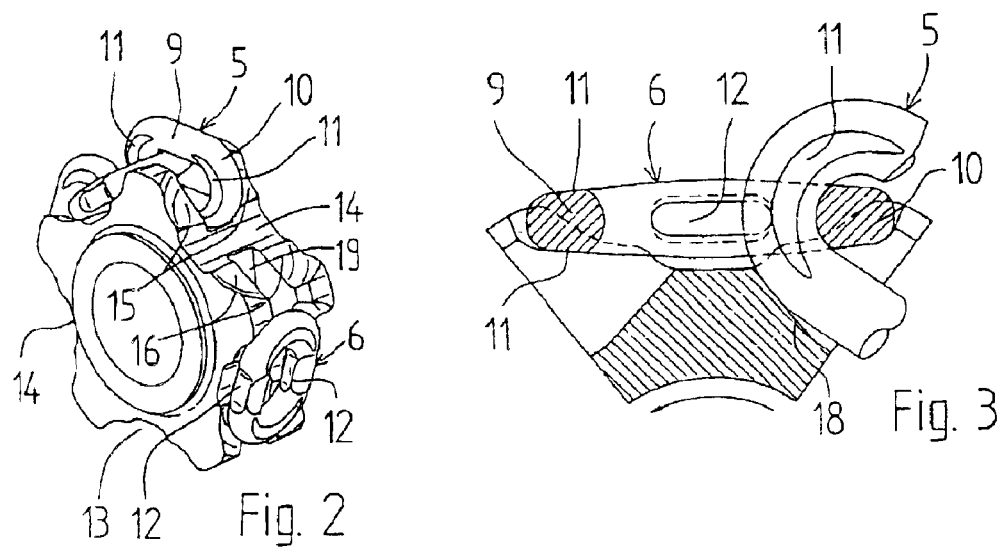

US 6,925,794 B2

CHAIN, CHAIN WHEEL AND CHAIN TRANSMISSION FOR LIFTING GEAR

TECHNICAL FIELD

The invention relates to a chain, a chain wheel and a chain transmission.

PRIOR ART

As lifting gear chains, use is generally made—as is disclosed, for example, in EP 0 812 295 B1— of conventional round steel chains of welded links, the cross section of which, if a slight increase in cross section in the region of the welding beads of the links is disregarded, is virtually the same overall. In many cases, lifting gear equipped with chains of this type meet the requirements demanded of them. Despite this, the experts entrusted with the development of modern lifting gear are endeavoring to increase both the load-bearing capacity and the service life of chains of this type, by following different paths. Thus, EP 0 816 717 A2 discloses the use, instead of round steel chains, of lifting gear chains made of oval links having a D-profile cross section in order, in the region of the conventionally planar bottoms of a pocket chain wheel, to reduce the surface pressure between the chain links passing in a lying manner through the chain wheel (horizontal links) and the chain wheel, and, moreover, to obtain an extensive support of the chain links passing in a standing manner through the chain wheel (vertical links). The progress obtained by the above-mentioned measures is kept within limits because, firstly, as before, the dynamic resistance of the chain links leaves something to be desired and, secondly, considerable surface pressures are effective during the rolling of the D-profile edges of the horizontal links along the flanks of the pocket-wheel teeth as the horizontal links are being pivoted into the pocket wheel. In order to reduce the risk of fatigue fracture in particular of the links of "heavy round steel chains", as are primarily used in underground mining, DE 44 26 506 A1 discloses compressing chain links, which are formed as round steel links, in the region of their longitudinal limbs for the purpose of reducing the internal width. Particularly when used in the case of lifting gear chains with short spacing, this process is associated with the risk of impermissibly large deformations of the welding points, quite irrespective of the fact that the movement of the chain links with respect to one another is restricted and the supporting ratios of chain links of this type in the pockets and grooves of pocket chain wheels cannot be satisfied.

SUMMARY OF THE INVENTION

The invention is based on the object of improving, while maintaining favorable pivoting-in ratios between the horizontal links and the chain wheel, the components essential for the functioning of a chain length, namely the chain serving to raise the load, the chain wheel serving to drive the chain and therefore the chain transmission itself, with the effect of increasing the dynamic resistance. This object is achieved by the measures arising from the present invention.

The chain design according to the invention noticeably increases, in particular, its dynamic fatigue strength, with not only the change in cross section, but also the structural compression, which is obtained by the plastic deformation within the framework of a cold upsetting process, in the region of the rounded ends of the chain links making a decisive contribution to the progress obtained. Moreover, an advantageous effect is brought about by the fact that a supplementary, intended deformation of the longitudinal limbs of the chain links enables their cross section to be adapted with regard to their resistance moments to the loading circumstances to an extent not previously achieved. The pockets of the pocket chain wheels serving to drive the chains according to the invention are adapted to the shape of the chain links forming the chains in a manner which is also of benefit to an increase in the service life and strength.

BRIEF DESCRIPTION OF THE DRAWINGS

Further features and details of the invention emerge from the claims, the description which follows and the attached drawing, the figures of which show the following:

FIG. 1 shows, schematically and partially in section, the essential components of a chain transmission which are of interest within the context of the invention;

FIG. 2 shows the perspective view of the chain wheel and of a plurality of chain links of the chain transmission according to FIG. 1;

FIG. 3 shows, on an enlarged scale, a partial section through the chain wheel according to FIGS. 1 and 2;

WAYS OF IMPLEMENTING THE INVENTION

Figure 4:
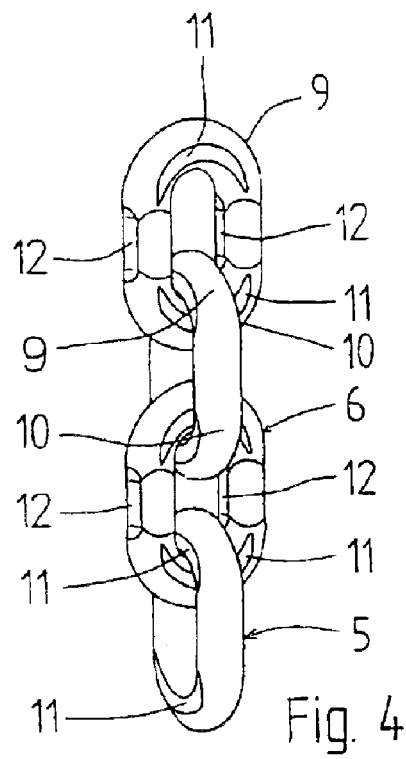
FIG. 4 shows the perspective view of a segment of the chain strand used in the chain transmission according to FIGS. 1 to 3.
Figure 5:
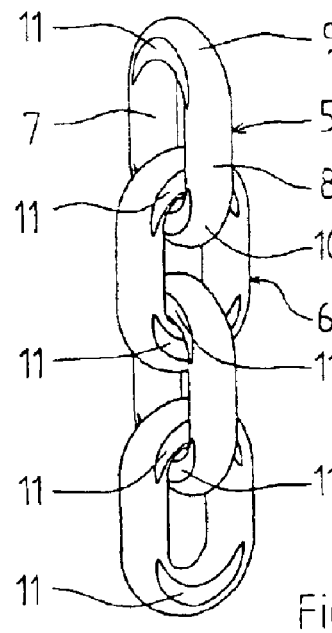
FIG. 5 shows the perspective view of a segment of a first, modified chain strand.

In FIG. 1, 1 is the housing of the chain transmission of a lifting gear, which transmission is equipped with a pocket chain wheel 2. The arrow 3 in the region of the axis of the chain wheel 2 indicates the rotational movement of the wheel during the lifting stroke. A chain 4 which comprises vertical links 5 and horizontal links 6 is guided via the chain wheel 2. All of the chain links 5 and 6 have flattened zones 11 which are produced by local, plastic cold deformation in the region of their rounded ends 9, 10, which are connected to one another by parallel longitudinal limbs 7, 8. The horizontal links 6 are provided in the region of their longitudinal limbs 7, 8, on respectively opposite sides, with additional, flattened zones 12 which are produced by local, plastic deformation and are essentially perpendicular with respect to a plane running through the centers of the two longitudinal limbs 7, 8. The flattenings on the links are undertaken before the heat treatment of the chain, i.e., in practice: first of all, a conventional round steel chain is produced and its oval links are then plastically deformed at certain points by suitable upsetting devices. By means of the deformation of the chain links 5, 6 in the region of their rounded ends 9, 10, not only is the fatigue limit of the links increased, but, moreover, favorable supporting ratios between the horizontal links 6 and the bottoms of the pockets 13 of the pocket chain wheel 2 are provided. For this purpose, the pockets 13 have, on both sides of a depression 14, oblique supporting surfaces 15, 16 for flattened zones 11 of the rounded ends 9, 10 of the horizontal links 6. The plastic deformation of the longitudinal limbs 7, 8 of the horizontal links 6 increases their flexural resistance, which has a positive effect in particular when these links are being pivoted into the pocket chain wheel. In cases in which only comparatively small loads are raised or lowered by a lifting gear, flattenings in the region of the longitudinal limbs 7, 8 may, if appropriate, be omitted and a chain of the type illustrated in FIG. 5 may be used. Also in the case of this chain, the cross-sectional and structural change brought about in the rounded-end region by the upsetting of the chain links 5, 6 leads to a noticeable increase in the fatigue limit.

Figure 6:
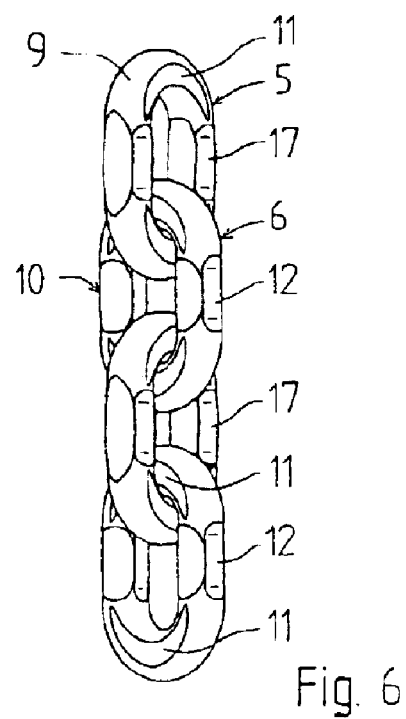
FIG. 6 shows the perspective view of a segment of a second, modified chain strand.
Figure 7:
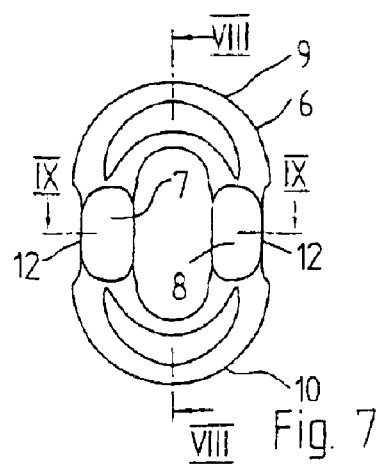
FIG. 7 shows the plan view of a horizontal link of the chain strand according to FIG. 6.
Figure 8:
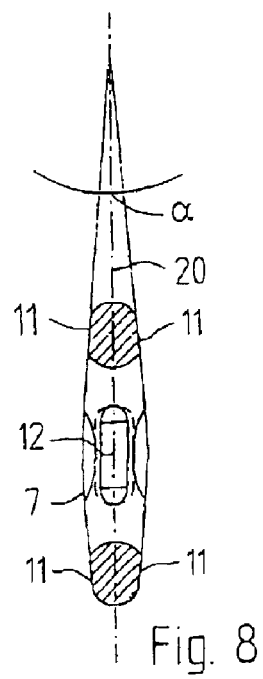
FIG. 8 shows a section along the line VIII—VIII in FIG. 7.
Figure 9:
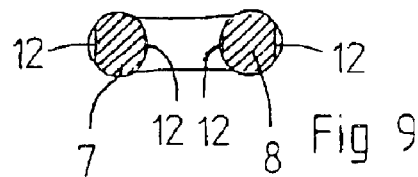
FIG. 9 shows a section along the line IX—IX in FIG. 7.
Figure 10:
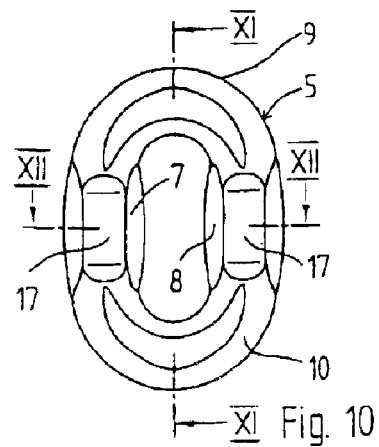
FIG. 10 shows the plan view of a vertical link of the chain strand according to FIG. 6.
Figure 11:
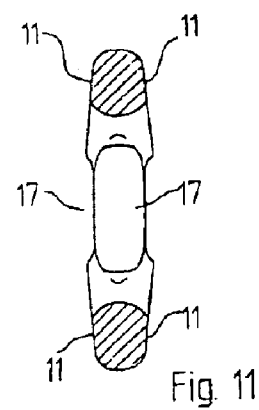
FIG. 11 shows a section along the line XI—XI in FIG. 10.
Figure 12:
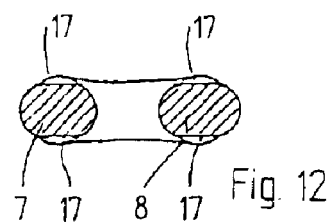
FIG. 12 shows a section along the line XII—XII in FIG. 10.

A chain of the type illustrated in FIG. 6, in which the longitudinal limbs 7, 8 of the vertical links 5 also have, on opposite sides, a respective flattened zone 17 orientated essentially parallel to the plane running through the centers of the two longitudinal limbs 7, 8, may be considered as optimum. The additional, plastic deformation of the longitudinal limbs 7, 8 of the vertical links 5 increases their flexural resistance in a manner similar to how the flattened zones 12 do this in the case of the horizontal links 6. For better understanding, FIGS. 8 to 9 illustrate a horizontal link 6 and FIGS. 10 to 12 illustrate a vertical link 5 of the chain according to FIG. 6 respectively in plan view and in two sections. It is obvious that the bottom 18 of the guide grooves 19 of a chain wheel equipped with a chain according to FIG. 6 has to be adapted to the shape of the vertical links 5.

FIG. 8 shows that the planes in which the flattened zones 11 of a pair of zones lie intersect, outside the chain link 6, that a longitudinal plane 20 of the chain link 6 which runs through the center of the rounded ends 9, 10 and of the longitudinal limbs 7, 8, said planes enclosing between them an angle α of between 5°–20°, and preferably an angle of 10°.

What is claimed is:
1. A chain having oval chain links which are produced from round steel material and have rounded ends comprising opposite, lateral flanks, said rounded ends being connected to one another by straight longitudinal limbs, characterized in that the chain links (5, 6) each have at least one flattened zone (11) on each of said rounded ends which is produced by local, plastic deformation in a region of the opposite, lateral flanks of the rounded ends (9, 10) of said chain links and extends essentially over the entire curvature of the respective rounded ends (9, 10).

2. The chain as claimed in claim 1, characterized in that each said rounded end (9, 10) of said chain link is provided on said opposite lateral flanks thereof with one said flattened zone (11).

3. The chain as claimed in claim 2, characterized in that planes in which the flattened zones (11) of a pair of said flattened zones lie intersect, outside the chain link (5, 6), a longitudinal plane (20) of the chain link (5, 6) which runs through the centers of the rounded ends (9, 10) and through the centers of the longitudinal limbs (7, 8).

4. The chain as claimed in claim 3, characterized in that the flattened zones (11) of one said rounded end (9, 10) define therebetween an angle (α) of approximately 5°–20°.

5. The chain as claimed in claim 1, characterized in that said longitudinal limbs (7, 8) of said chain links (6) are provided with flattened zones (12) produced by local, plastic deformation.

6. The chain as claimed in claim 5, characterized in that each said longitudinal limb (7, 8) at least of every second said chain link (6) has, on opposite sides thereof, a flattened zone (12) which is orientated essentially perpendicularly with respect to a plane running through the centers of the two longitudinal limbs (7, 8).

7. The chain as claimed in claim 5, characterized in that the longitudinal limbs (7, 8) of every second said chain link (5) have, on opposite sides thereof, flattened zone (17) orientated essentially parallel to a longitudinal plane (20) running through the centers of the two longitudinal limbs (7, 8).

8. The chain as claimed in claim 3 in combination with a pocket chain wheel, said pocket chain wheel having pockets, each said pocket having a central depression, characterized in that the bottoms of the pockets (13) are provided, on both sides of said central depression (14), with oblique supporting surfaces (15, 16) having a slope matching a slope of the flattened zones of the chain links.

9. The chain as claimed in claim 2, characterized in that said longitudinal limbs (7, 8) of said chain links (6) are provided with flattened zones (12) produced by local, plastic deformation.

10. The chain as claimed in claim 3, characterized in that said longitudinal limbs (7, 8) of said chain links (6) are provided (7, 8) with flattened zones (12) produced by local, plastic deformation.

11. The chain as claimed in claim 4, characterized in that said longitudinal limbs (7, 8) of said chain links (6) are provided with flattened zones (12) produced by local, plastic deformation.

12. The chain as claimed in claim 9, characterized in that each said longitudinal limb (7, 8) at least of every second said chain link (6) has, on opposite sides thereof, a flattened zone (12) which is orientated essentially perpendicularly with respect to a plane running through the centers of the two longitudinal limbs (7, 8).

13. The chain as claimed in claim 10, characterized in that each said longitudinal limb (7, 8) at least of every second said chain link (6) has, on opposite sides thereof, a flattened zone (12) which is orientated essentially perpendicularly with respect to the longitudinal plane running through the centers of the two longitudinal limbs (7, 8).

14. The chain as claimed in claim 11, characterized in that each said longitudinal limb (7, 8) at least of every second said chain link (6) has, on opposite sides thereof, a respective flattened zone (12) which is orientated essentially perpendicularly with respect to the longitudinal plane running through the centers of the two longitudinal limbs (7, 8).

15. The chain as claimed in claim 6, characterized in that the longitudinal limbs (7, 8) of every second said chain link (5) have, on opposite sides thereof, a flattened zone (17) orientated essentially parallel to the plane (20) running through the centers of the two longitudinal limbs (7, 8).

16. The chain as claimed in claim 4 in combination with a pocket chain wheel, said pocket chain wheel having pockets, each said pocket having a central depression, characterized in that the bottoms of the pockets (13) are provided, on both sides of said central depression (14), with oblique supporting surfaces (15, 16) having a slope matching a slope of the flattened zones of the chain links.

17. A chain transmission for lifting gear having a chain which is driven by a pocket chain wheel, bears a load at one of two free ends thereof, and has oval chain links having opposed rounded ends connected to each other by straight longitudinal limbs which are produced from round steel material and which alternately pass through the pocket chain wheel as horizontal links, which lie in pockets of the pocket chain wheel, and as vertical links standing in central guide grooves of said pocket chain wheel, characterized in that the rounded ends (9, 10) both of the horizontal links (6) and of the vertical links (5) have flattened zones (11) which are produced by local, plastic deformation on opposite, lateral flanks of said rounded ends thereof, respectively, and extend essentially over the entire curvature of the rounded ends, respectively.

18. The chain transmission as claimed in claim, 17, characterized in that the longitudinal limbs (7, 8) of the horizontal links (6) of the chain (4) have, on opposite sides, a flattened zone (12) orientated essentially perpendicularly with respect to the bottom of the pockets (13) of the pocket chain wheel (2) and with respect to a longitudinal plane (20) running through the centers of the two longitudinal limbs (7, 8).

19. The chain transmission as claimed in claim 17, characterized in that the longitudinal limbs (7, 8) of the vertical links (5) of the chain (4) have, on opposite sides, a flattened zone (17) which is orientated essentially perpendicularly with respect to the bottom (18) of the central guide grooves (19) of the pocket chain wheel (2) and parallel to a longitudinal plane (20) running though the centers of the two longitudinal limbs (7, 8).

20. The chain transmission as claimed in claim 18, characterized in that the longitudinal limbs (7, 8) of the vertical links (5) of the chain (4) have, on opposite sides thereof, a flattened zone (17) which is orientated essentially perpendicularly with respect to the bottom (18) of the central guide grooves (19) of the pocket chain wheel (2) and parallel to the longitudinal plane (20) running though the centers of the two longitudinal limbs (7, 8).

* * * * *

UNITED STATES PATENT AND TRADEMARK OFFICE
CERTIFICATE OF CORRECTION

PATENT NO. : 6,925,794 B2
DATED : August 9, 2005
INVENTOR(S) : Hans Dalferth et al.

It is certified that error appears in the above-identified patent and that said Letters Patent is hereby corrected as shown below:

Column 3,
Line 35, delete "that".

Column 4,
Line 9, before "flattened", add -- a --.
Line 26, delete "(7, 8)".

Signed and Sealed this

Fourth Day of October, 2005

JON W. DUDAS
*Director of the United States Patent and Trademark Office*

UNITED STATES PATENT AND TRADEMARK OFFICE
CERTIFICATE OF CORRECTION

PATENT NO. : 6,925,794 B2
DATED : August 9, 2005
INVENTOR(S) : Hans Dalferth et al.

It is certified that error appears in the above-identified patent and that said Letters Patent is hereby corrected as shown below:

Title page,
Item [73], Assignee, delete "RUD Kettenfabrik Reiger & Dietz GmbH u. Co." and substitute -- RUD Kettenfabrik Rieger & Dietz GmbH u. Co. --.

Signed and Sealed this

First Day of November, 2005

JON W. DUDAS
*Director of the United States Patent and Trademark Office*